(12) United States Patent
Hasegawa

(10) Patent No.: US 8,134,317 B2
(45) Date of Patent: Mar. 13, 2012

(54) MOTOR CONTROLLER, MOTOR DRIVE SYSTEM AND PUMP UNIT

(75) Inventor: Yukihisa Hasegawa, Machida (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 388 days.

(21) Appl. No.: 12/556,119

(22) Filed: Sep. 9, 2009

(65) Prior Publication Data

US 2010/0060213 A1 Mar. 11, 2010

(30) Foreign Application Priority Data

Sep. 9, 2008 (JP) ................................. 2008-230879

(51) Int. Cl.
*H02P 6/12* (2006.01)

(52) U.S. Cl. ............ 318/400.17; 318/400.12; 318/400.2

(58) Field of Classification Search ............. 318/400.04, 318/400.05, 400.12, 400.14, 400.17, 400.2, 318/400.21, 700, 720–724
See application file for complete search history.

(56) References Cited

U.S. PATENT DOCUMENTS

| 4,651,068 A | * | 3/1987 | Meshkat-Razavi | ...... 318/400.02 |
| 5,043,642 A | * | 8/1991 | Ohi | .......................... 318/400.17 |
| 6,628,096 B1 | * | 9/2003 | Chen | ........................... 318/400.2 |
| 2005/0017661 A1 | * | 1/2005 | Kane et al. | .................... 318/254 |
| 2005/0036228 A1 | * | 2/2005 | Kimura et al. | ............. 360/73.03 |

FOREIGN PATENT DOCUMENTS

| JP | 2000-324873 | 11/2000 |
| JP | 2004-328821 | 11/2004 |

* cited by examiner

*Primary Examiner* — Bentsu Ro
(74) *Attorney, Agent, or Firm* — Oblon, Spivak, McClelland, Maier & Neustadt, L.L.P.

(57) ABSTRACT

A motor controller for controlling a permanent magnet motor having a rotor having a permanent magnet and a stator having multiphase windings including a position detector generating and outputting rotor rotational position signal; a waveform data storage storing sinusoidal waveform data; a drive signal output section reading the waveform data from the waveform data storage at timings determined based on the rotational position signal and outputting a voltage signal corresponding to the waveform data to the windings through a drive section; a data history storage storing data corresponding to the voltage signal of previous control period; and an output data modifier that, when outputting the voltage signal in current control period, compares corresponding waveform data with previous waveform data, and if difference between the current and the previous data is equal to or greater than a predetermined value, current output data is modified by a portion of the difference.

7 Claims, 14 Drawing Sheets

| FIG.1 |
|---|
| FIG.1A | FIG.1B |

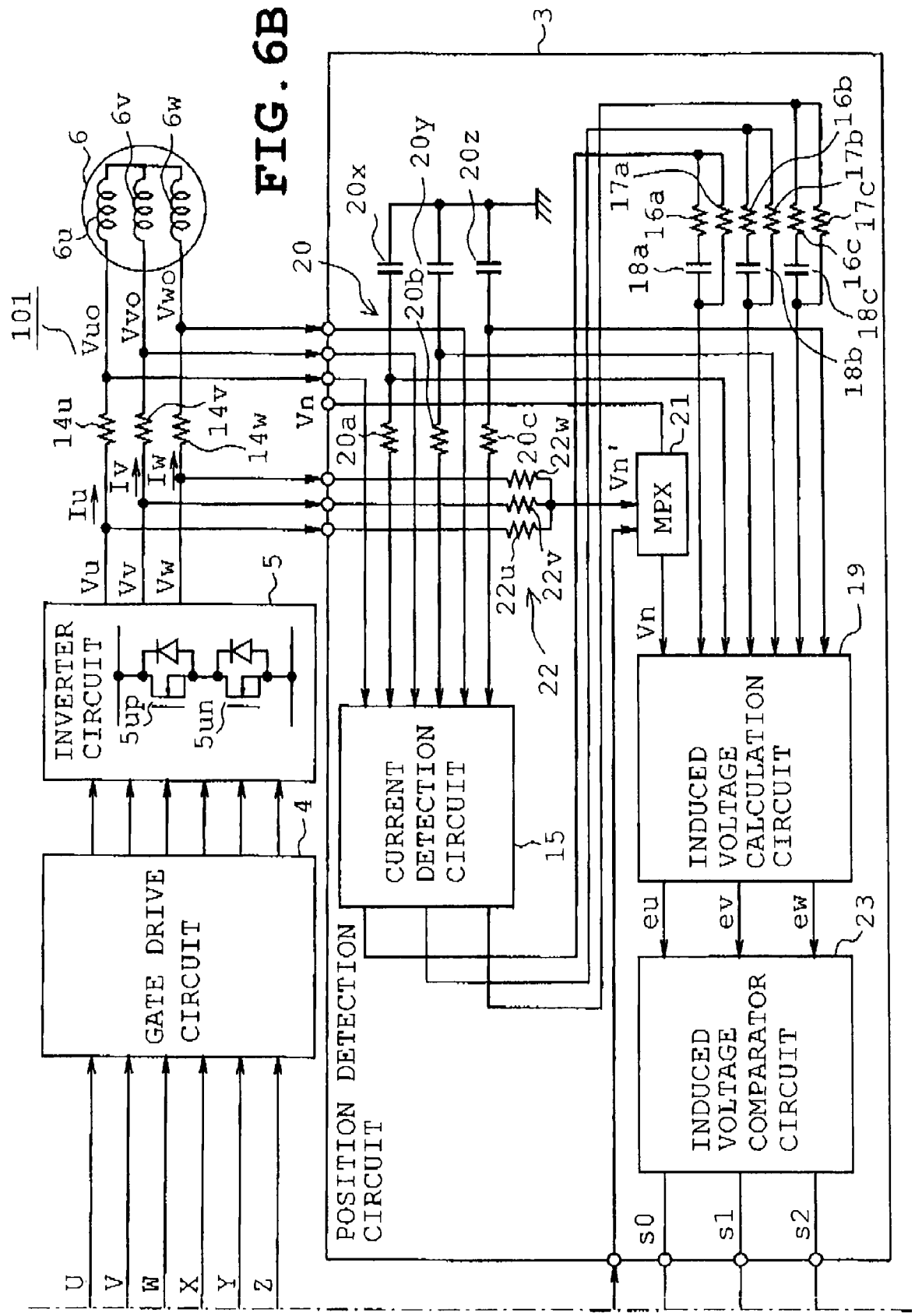

MOTOR CONTROLLER, MOTOR DRIVE SYSTEM AND PUMP UNIT

CROSS-REFERENCE TO RELATED APPLICATIONS

This application is based upon and claims the benefit of priority from the prior Japanese Patent Application 2009-230879, filed on Sep. 9, 2008 the entire contents of which are incorporated herein by reference.

FIELD

The present invention relates to a motor controller that controls a permanent magnet motor including a rotor provided with a permanent magnet and a stator provided with multiphase windings. The present invention also relates to a motor drive system configured by the above described motor controller, and also to a pump unit incorporating the motor drive system.

BACKGROUND

Permanent magnet motors such as a brushless DC (Direct Current) motor have been driven sinusoidally using a low cost 8 bit microcomputer. One example of such technology is disclosed in JP 2000-324873 A, hereinafter referred to as patent publication 1, in which rotor positioning is sensed by a position sensor configured by a Hall element, for instance, whereafter sinusoidal wave data is read from medium such as a ROM (Read Only Memory) based on the sensed rotor position and motor winding is energized based on the read data. Under such configuration, phase control can be readily executed by modifying the address of the ROM from which sinusoidal wave data is to be read.

However, since position signal sensed by the position sensor is coarse, having an electrical angular interval of 60 degrees, time lag is frequently produced to the actual time of operation due to the read time expended in reading the data stored in the ROM. This often leads to failure in outputting a drive signal pattern corresponding to the proper position.

JP 2004-328821 A hereinafter referred to as patent publication 2 attempts to eliminate such time lag by comparing the position detection signal with the position command signal and resetting the position command signal if a deficit equal to or greater than a predetermined value exists between the two, to synchronize the motor position and the drive position.

In the approach disclosed in patent publication 2, a sudden change in voltage is observed from time to time when comparing the drive waveform before and after the synchronization. This is caused by the dramatic change in the read address originating from the correction of shift in the position signal and unwantedly leads to distortion in the sinusoidal wave representing the motor drive waveform which ultimately produces noise. Such noise emission will significantly impair product quality in automobile motor drive systems which quietness is a key factor in product evaluation.

SUMMARY

One of the advantages of the present invention is providing a motor controller, a motor drive system, and a pump unit that is capable of outputting waveforms that proximate a sinusoidal waveform even when there is a shift in the output timing of a rotational position signal.

In one aspect, there is provided a motor controller for controlling a permanent magnet motor including a rotor provided with a permanent magnet and a stator provided with multiphase windings including a position detector that generates and outputs a rotational position signal of the rotor; a waveform data storage that stores sinusoidal waveform data; a drive signal output section that reads the waveform data from the waveform data storage at timings determined based on the rotational position signal and that outputs a voltage signal corresponding to the waveform data to the windings through a drive section; a data history storage that stores data corresponding to the voltage signal outputted in a previous control period; and an output data modifier that, when outputting the voltage signal in a current control period, compares corresponding waveform data with a previous data stored in the data history storage, and if difference between the current waveform data and the previous data is equal to or greater than a predetermined value, data to be currently outputted is modified by an amount corresponding to a portion of the difference.

According to the above described configuration, even if the waveform data read from the waveform data storage significantly deviates from the amplitude rate of a sinusoidal wave due to the shift in output timing of rotational position signals obtained by the position detector, the motor can continue to be driven smoothly since modification is carried out in the amount corresponding to only a portion of the difference of the previous and the current data, thereby reducing the impact of the modification on the status of motor drive.

In another aspect of the present invention, there is provided a motor drive unit including a permanent magnet motor that includes a rotor provided with a permanent magnet and a stator provided with multiphase windings; a position detector that generates and outputs a rotational position signal of the rotor; a waveform data storage that stores sinusoidal waveform data; a drive signal output section that reads the waveform data from the waveform data storage at timings determined based on the rotational position signal and that outputs a voltage signal corresponding to the waveform data to the windings through an inverter circuit; a data history storage that stores data corresponding to the voltage signal outputted in a previous control period; and an output data modifier that, when outputting the voltage signal in a current control period, compares corresponding waveform data with a previous data stored in the data history storage, and if difference between the current waveform data and the previous data is equal to or greater than a predetermined value, data to be currently outputted is modified by an amount corresponding to a portion of the difference.

According to the above described configuration, the voltage signal generated and outputted by the motor controller can be given to the inverter circuit to drive the permanent magnet motor.

In another aspect, there is provided a pump unit including a pump mechanism that transfers fluid; a pump motor that includes a rotor provided with a permanent magnet and a stator provided with multiphase windings and that drives the pump mechanism; a position detector that generates and outputs a rotational position signal of the rotor; a waveform data storage that stores sinusoidal waveform data; a drive signal output section that reads the waveform data from the waveform data storage at timings determined based on the rotational position signal and that outputs a voltage signal corresponding to the waveform data to the windings through an inverter circuit; a data history storage that stores data corresponding to the voltage signal outputted in a previous control period; and an output data modifier that, when outputting the voltage signal in a current control period, compares corresponding waveform data with a previous data stored in the data history storage, and if difference between the current waveform data and the previous data is equal to or greater than a predetermined value, data to be currently outputted is modified by an amount corresponding to a portion of the difference.

According to the above described configuration, by controlling the pump motor by the motor drive system, fluid can be transferred by the pump mechanism.

BRIEF DESCRIPTION OF THE DRAWINGS

FIGS. 6A and 6B correspond to FIGS. 1A and 1B and describes a second exemplary embodiment of the present invention;

DETAILED DESCRIPTION

Figure 1A:
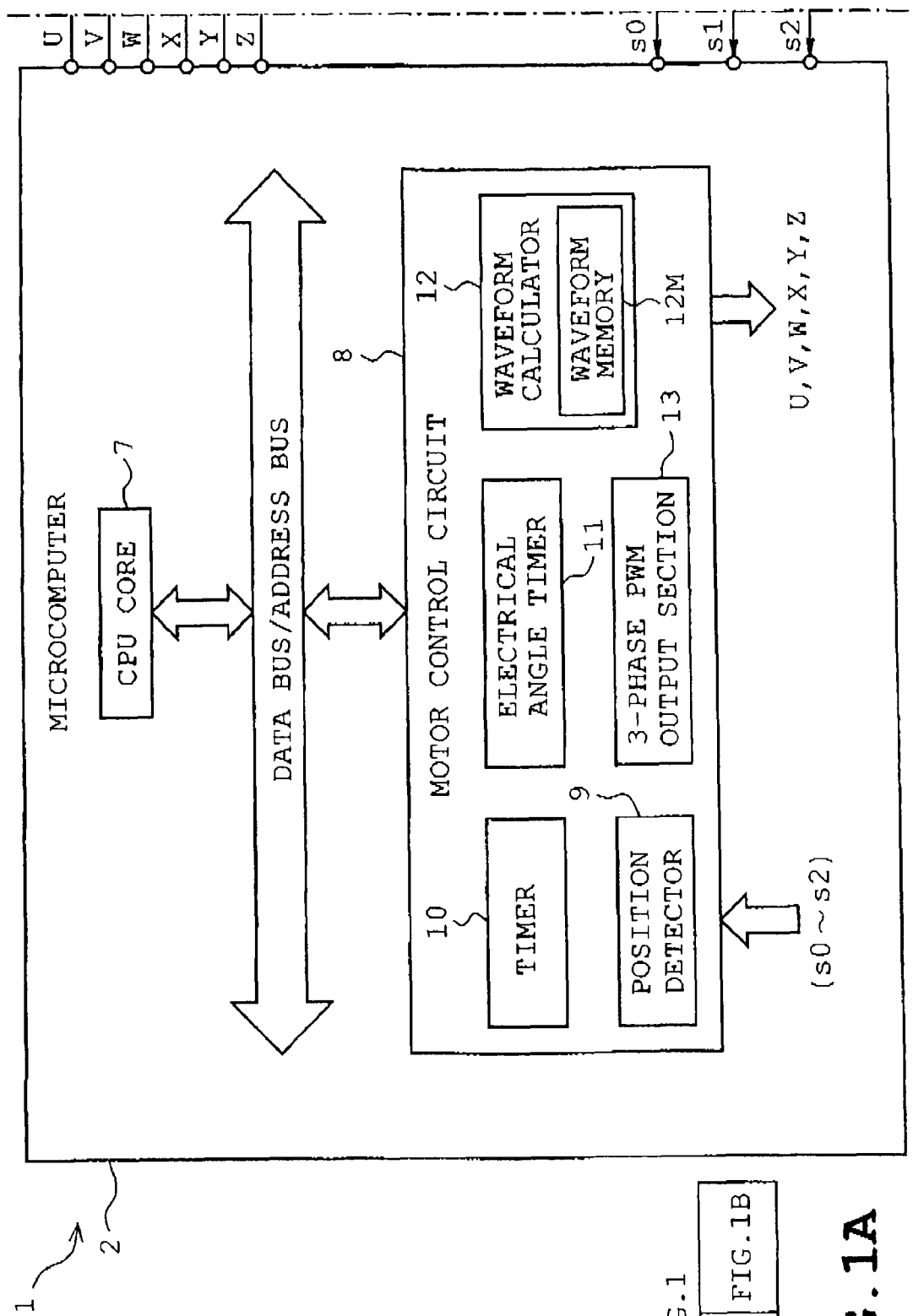
FIGS. 1A and 1B show a system configuration of a motor control system according to a first exemplary embodiment of the present invention.
Figure 1B:
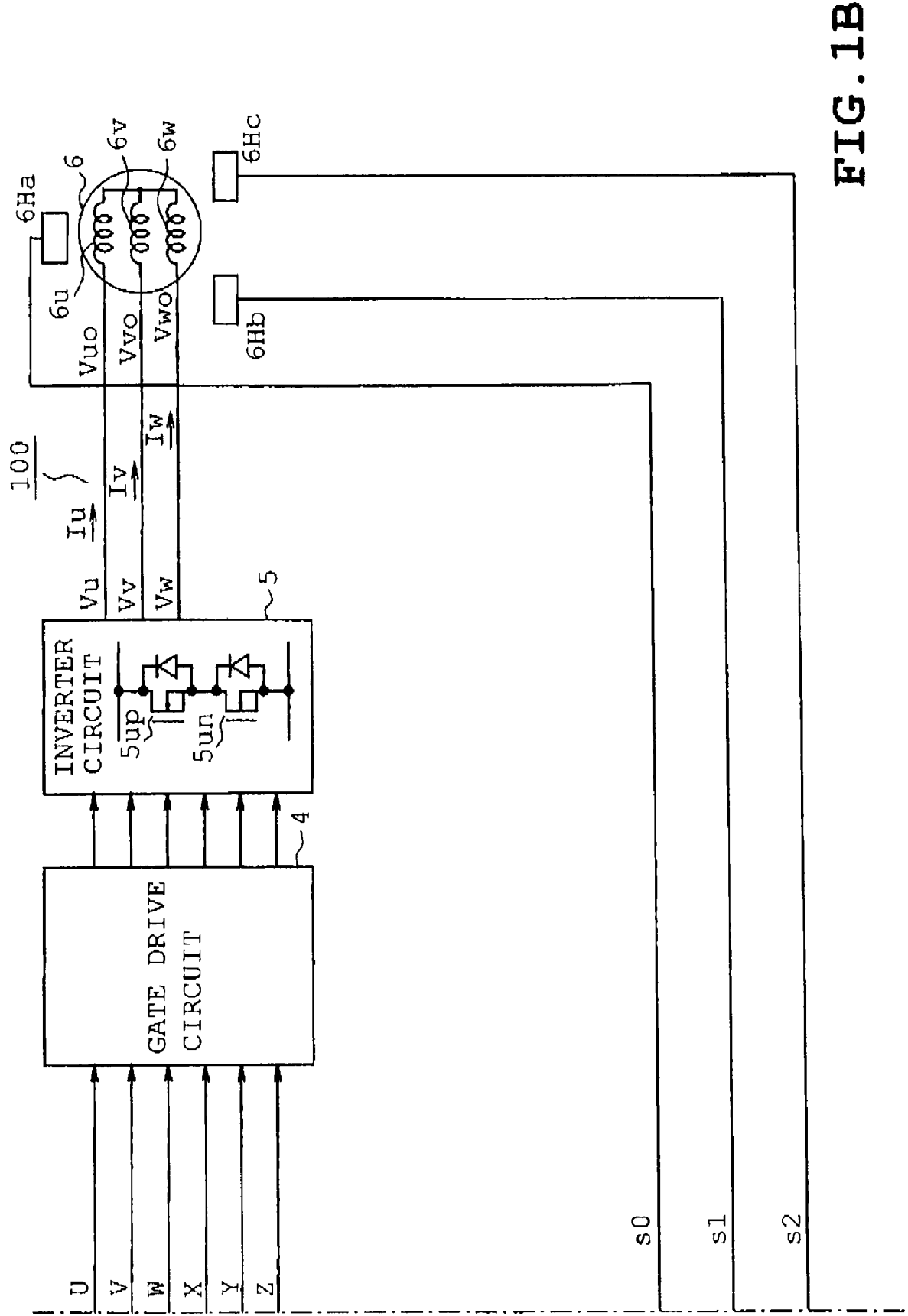

One exemplary embodiment of the present invention will be described hereinafter with reference to FIGS. 1 to 5. FIGS. 1A and 1B depict a system for driving a brushless DC motor. Control IC (Integrated Chip) 1 constituting a motor controller is primarily configured by a microcomputer 2 such as an 8 bit micro-controller "TMP88CH41" manufactured by Toshiba Corporation that drives a motor sinusoidally by PWM (Pulse Width Modulation) control. Control IC1 establishes connections with brushless DC motor 6 through gate drive circuit 4 and inverter circuit 5 serving as a drive section.

Brushless DC motor 6 is used in applications such as a spindle motor for rotating storage medium typically of a disc type such as a DVD (Digital Versatile Disc), CD (Compact Disc), and HDD (Hard Disc Drive); and a pump motor for pumping vehicle fuel. Brushless DC motor 6 is configured by a permanent magnet motor including a rotor provided with a permanent magnet and a stator provided with three phase windings $6u$, $6v$, and $6w$. Brushless DC motor 6 is further provided with Hall elements 6Ha, 6Hb, and 6Hc functioning as a position sensor for sensing the rotor position. The configuration depicted in FIGS. 1A and 1B exclusive of motor 6 constitutes motor drive system 100.

Microcomputer 2 represents the portion or motor control circuitry primary responsible for motor control. Microcomputer 2 controls has a CPU (Central Processing Unit) core 7 that controls motor control circuit 8 through interfaces such as an address bus or data bus. Motor control circuit 8 is configured by elements such as position detector 9 that detect variation timing in position signals s0 to s2 inputted by Hall elements 6Ha, 6Hb, and 6Hc; timer 10 that issues events in three types of electrical angle timings based on the detection at position detector 9; electrical angle timer 11 that counts the electrical angle; a waveform calculating section 12 functioning as an output data modifier that calculates PWM duty for outputting sinusoidal waveforms, and a three-phase PWM output section 13 serving as a drive signal output section that outputs three-phase PWM signals. Waveform calculating section 12, being responsible for outputting sinusoidal voltage signals to motor 6, includes waveform memory 12M functioning as a waveform data storage that stores waveform data associated with amplitude ratio of a sinusoidal wave.

Inverter circuit 5 is configured by a three-phase bridge configuration of six FETs (Field Effect Transistor) connected between the power supply line and the ground line, though only FET $5up$ and $5un$ constituting the upper and lower arm of the U phase is shown in FIGS. 1A and 1B. Position signals s0 to s2 outputted from Hall elements 6Ha to 6Hc are given to the input ports of microcomputer 2. In the earlier mentioned product of Toshiba Corporation, the input ports are represented as PDU, PDV, and PDW. When receiving input signals s0 to s2, position detector 9 of microcomputer 2 issues position detection interruption INTPDC.

Figure 2:
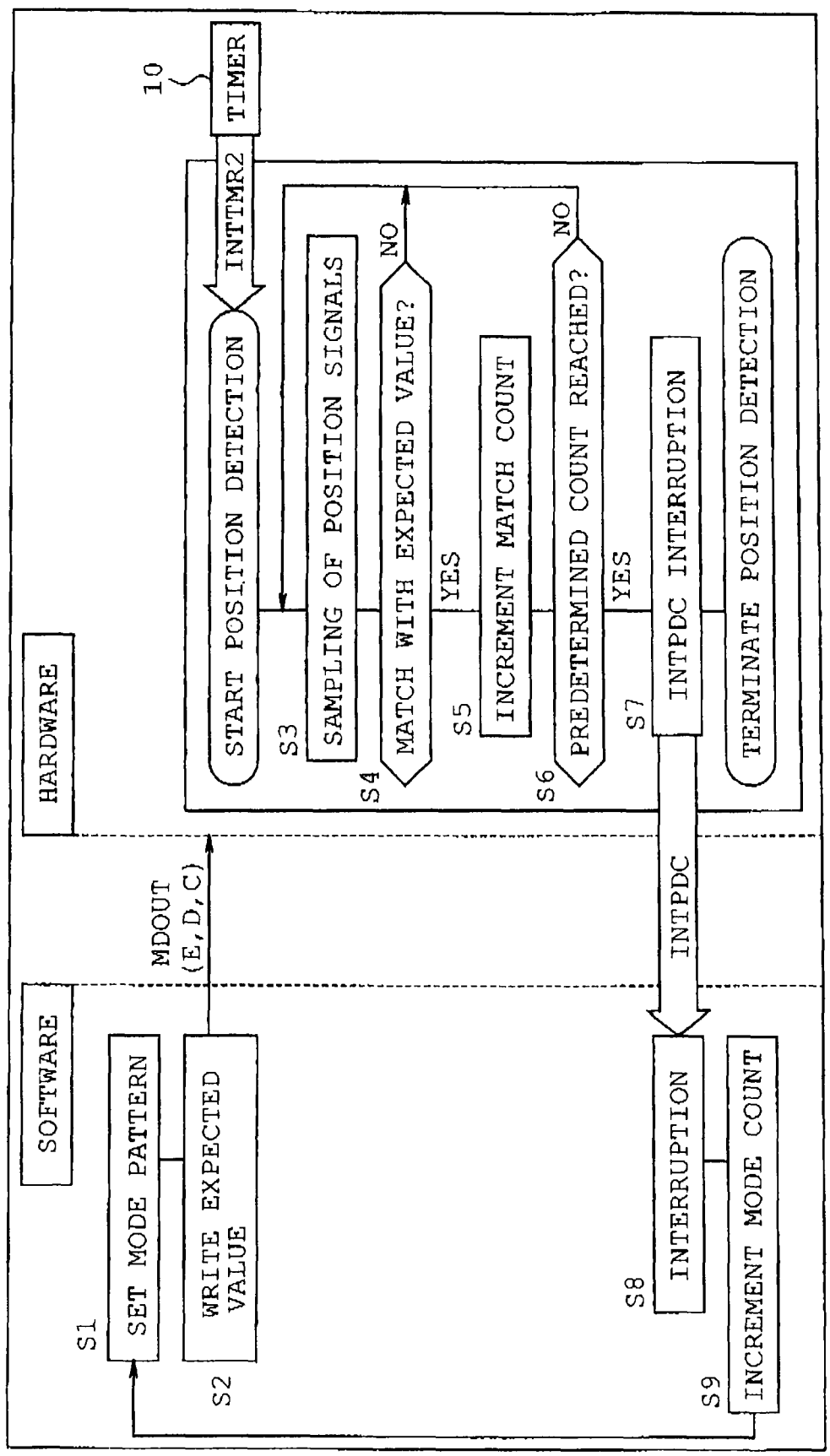
FIG. 2 is a flowchart providing an overview of a control flow of a general motor control executed by a microcomputer.

Next, the operation of microcomputer 2 receiving inputs of position signals s0 to s2 will be described with reference to FIG. 2. FIG. 2 is a flowchart briefly describing a general motor control employed by microcomputer 2 focusing primarily on the processing carried out by position detector 9. The label "SOFTWARE" in the flowchart indicates the processes executed by CPU core 7 of microcomputer 2 according to a control program, whereas the label "HARDWARE" in the flowchart indicates the process executed by the hardware logic configured in microcomputer 2.

As the first step of the process flow, a mode pattern is set (step S1). A mode pattern is a pattern constituting a combination of HIGH and LOW position signals s0 to s2 which is altered every 60 degrees in electrical angle. One of such patterns is written in the output register as an expected value (step S2).

The hardware process, on the other hand, starts the position detection process by sampling position signals s0 to s2 when interruption INTMR2 is issued by timer 10 (step S3). The sampling is repeated until the result matches the expected value (step S4: NO). When the result of sampling finds a match with the expected value (step S4: YES), the count of match managed by the process is incremented (step S5) and sampling is further repeated (step S6: NO) until the count of match reaches a predetermined value.

When the count of match reaches the predetermined value (step S6: YES), position detector 9 issues interruption INTPDC to CPU core 7 (step S7). Then, CPU core 7 executes a process associated with the interruption (step S8) and increments the mode counter (step S9) which repeatedly laps the count of 0 to 5 to return to step S1. The configuration of the position detector 9 described above is disclosed in FIGS. 2 to 48 shown in page 92 of "The User's Manual for TMP88CH41 (ver. 2003-06-03) published by Toshiba Corporation.

Figure 3A:
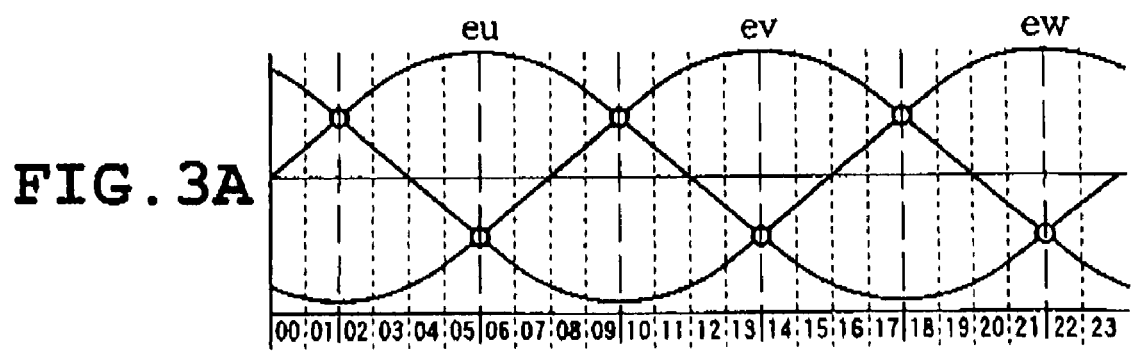
FIGS. 3A to 3D are waveform charts of PWM signals generated based on sinusoidal data.
Figure 3B:
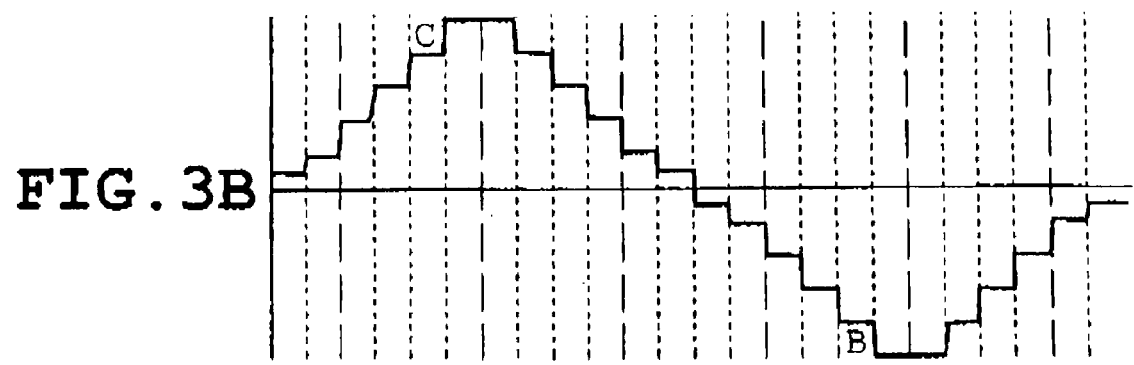

FIG. 3A depicts sinusoidal voltage waveforms outputted by three-phase PWM output section 13 of microcomputer 2. More specifically, FIG. 3A shows the output waveforms of the three-phase Hall elements 6Ha to 6Hc, and the variation points of these waveforms indicate the variation points of the position detection mode which are encountered every 60-degree electrical angles. FIG. 3B shows the PWM signal duty command that correspond to sinusoidal wave. As FIG. 3B shows, the PWM signal duty command can be varied every 15 degrees since interval of 15 degrees in electrical angle can be obtained by sensing the interval between the variation points shown in FIG. 3A with a counter and dividing the counter value into fourths, for example.

Figure 3C:
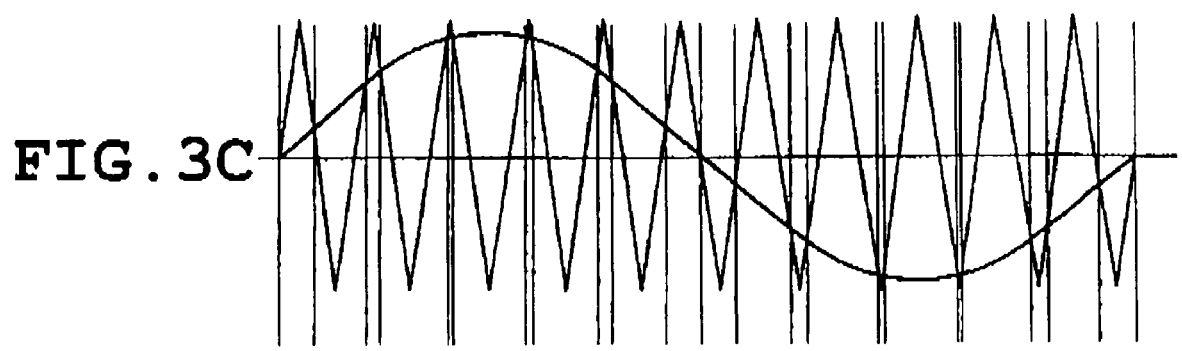
Figure 3D:
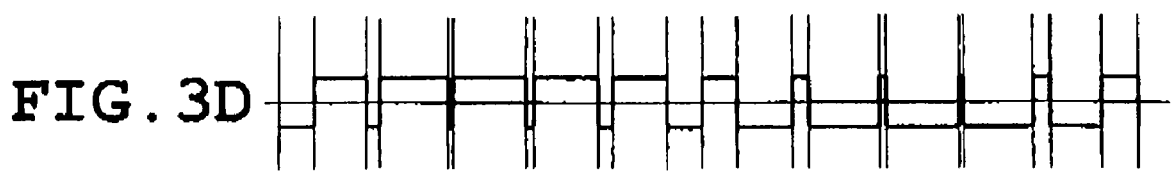

FIG. 3C is a superimposed view of a triangular wave serving as carrier wave and a sinusoidal wave of the PWM control. Of note is that only the sinusoidal wave corresponding to the U-phase is shown and for the purpose of presentation, carrier wave frequency is set lower than the actual value. The PWM signal shown in FIG. 3D is generated based on the command value shown in FIG. 3B and the carrier wave shown in FIG. 3C. Though FIGS. 3C and 3D have an analog look, digital output of PWM signal can be produced by, inversing the output level at the moment when the count indicated by the counter that keeps track of count at the carrier wave period matches the command value shown in FIG. 3B.

By applying this PWM signal on each of phase windings 6u, 6V, and 6w of motor 6 through inverter circuit 5, a sinusoidal drive voltage can be obtained. Waveform calculating section 12 of the present exemplary embodiment is configured to modify its sinusoidal data output and store the sinusoidal wave data previously outputted (one output period earlier) to memory 12M constituting the history data storage.

Next, the method of modifying the drive waveform is described with reference to the schematic waveforms shown in FIGS. 4A and 4B and the flowcharts shown in FIGS. 5A and 5B. The above described history data storage and the elements pertaining to the drive waveform modification described hereinafter are not provided in the microcomputer TMP88CH41 of Toshiba Corporation.

Figure 5A:
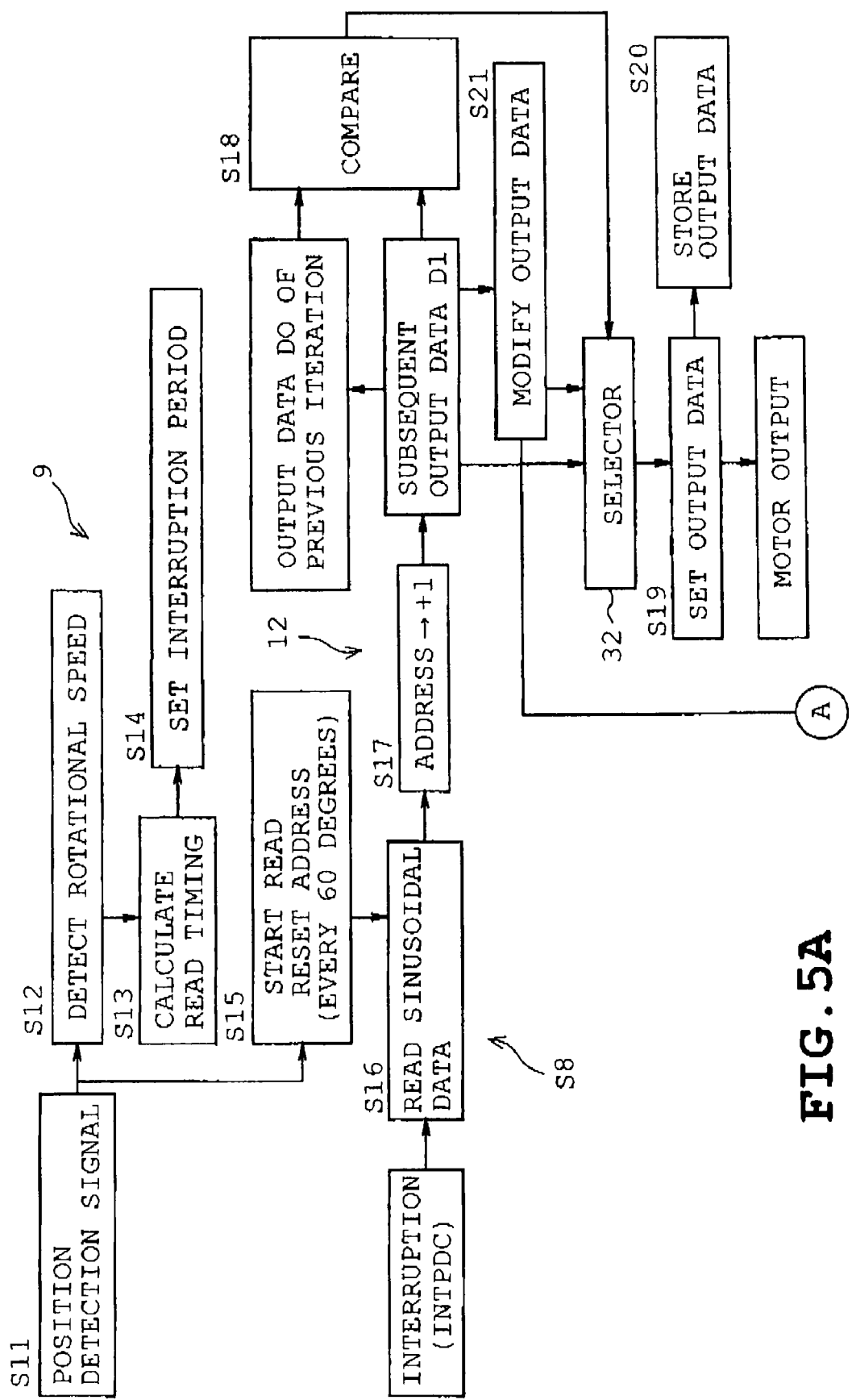
FIG. 5A is a flowchart indicating an internal process flow of a position detector and a waveform calculating section and the content of step S8 indicated in FIG. 2.

FIG. 5A is a flowchart featuring the internal processing of position detector 9 and waveform calculating section 12, and interruption process indicated at step S8 of FIG. 2. When position detector 9 detects the variation timing of position signals s0 to s2 by the process indicated in FIG. 2 (step S11), the rotational speed of motor 6 is detected based on the interval defined by the detected variation timing (step S12). Then, when the timing for reading the sinusoidal wave data in the next iteration has been calculated based on the rotational speed of motor 6 (step S13), the timing is set as the interruption period of INTPDC (step S14).

Also, when variation timing of position signals s0 to s2 have been detected, starting address for reading sinusoidal wave data at waveform calculating section 12 is reset according to the detection timing that is encountered every 60-degree electrical angle (step S15). Then, when interruption INTPDC occurs, sinusoidal wave data is read at waveform calculating section 12 (step S16). After reading the data, the reading address is incremented by the amount corresponding to the electrical angle of 15 degrees (step S17).

Then, waveform calculating section 12 compares the previously output sinusoidal wave data D0 with sinusoidal wave data D1 which is outputted in the current iteration (step S18). If the address is incremented by a constant value and the output data is not modified, the difference of the previous and the current value takes a predetermined value reflecting the amount of variation of the sinusoidal data. As opposed to this, when Hall elements 6Ha, 6Hb, and 6Hc are not mounted precisely at 120-degree electrical interval, the displacement causes a shift in the variation timing in position signals s0 to s2. As a result, drive waveform of motor 6 is significantly deviated from the sinusoidal waveform because the value of data outputted before and after the variation timing is outputted in timings which is inconsistent to the proper chronology of a sinusoidal wave.

In the present exemplary embodiment, after calculating the difference between previously outputted sinusoidal data D0 and currently outputted sinusoidal data D1, variation rate per unit time is obtained from the difference which is thereafter further judged whether or not it is greater than a predetermined value A which is given as an absolute value. Predetermined value A is set at a value greater than the amplitude variation rate of the sinusoidal wave and the specified value is variably specified depending upon the rotational speed and the rotor position of motor 6. If the variation rate is equal to or less than predetermined value A, the selector is instructed to output the data to be outputted (scheduled output data) in the current iteration as it is (step S19) and at the same time, stores the data (step S20).

If the variation rate is greater than the predetermined value A at step S18, on the other hand, scheduled output data is modified (step S21), and the selector is instructed to output the modified data (step S19).

Figure 4B:
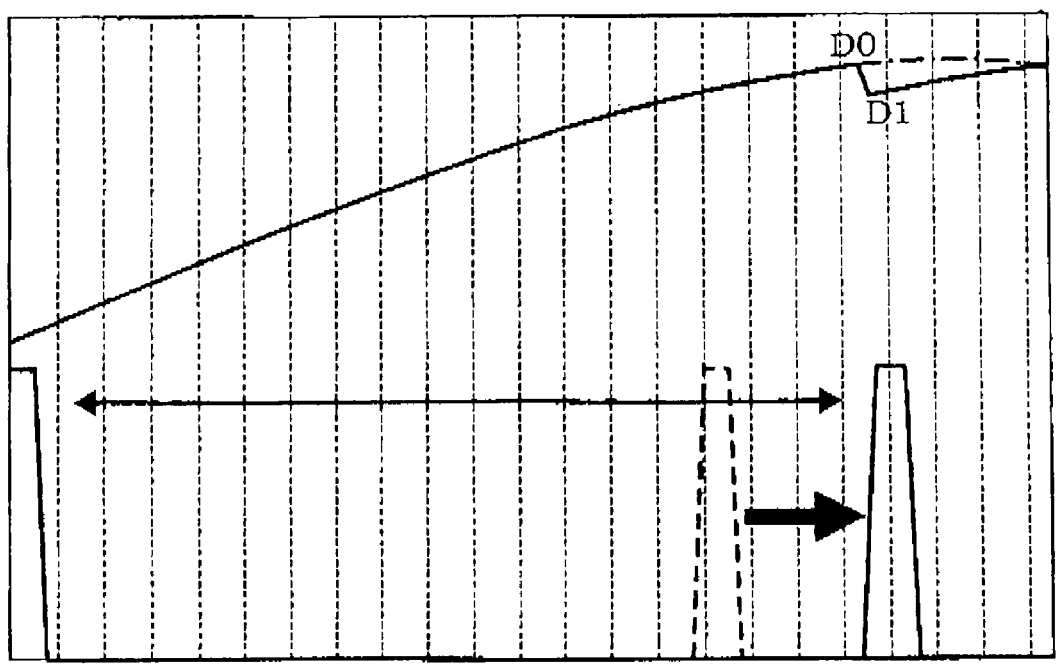
Figure 5B:
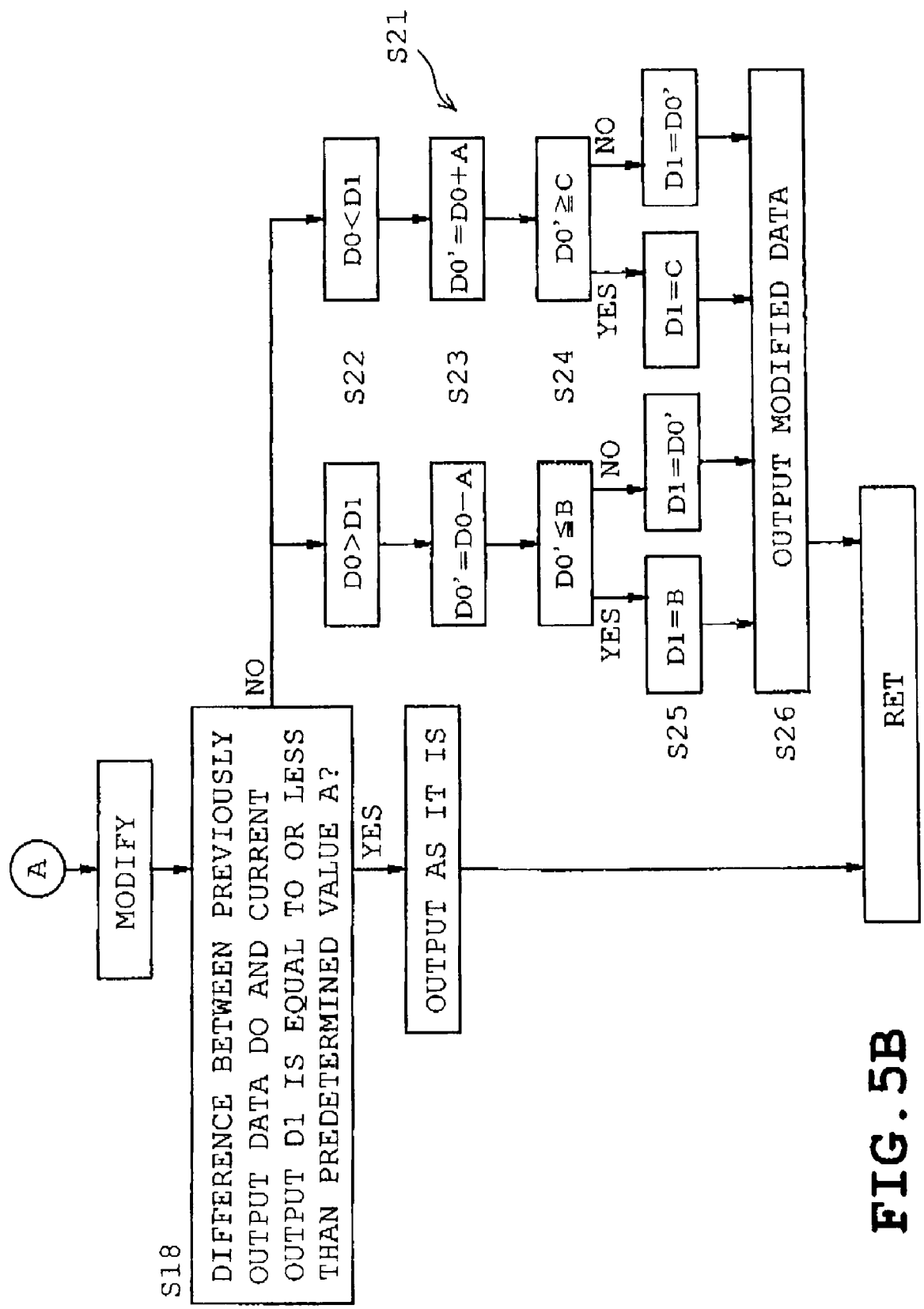
FIG. 5B is a flowchart indicating the detail of data modification performed at step S21.

FIG. 5B is flowchart describing in detail the data modification carried out at step S21. The process takes a different course of action depending upon the evaluation of size between data D0 and D1 made at step S22. If D0>D1, which is depicted in FIG. 4B, data D0' is obtained by subtracting predetermined value A from data D0 (step S23), and the size of data D0' is further compared with minimum value B of the sinusoidal data (step S24). If D0'≦B, minimum value B is represented as data D1 and if D0'>B, data D0' is represented as data D1 (step S25).

Figure 4A:
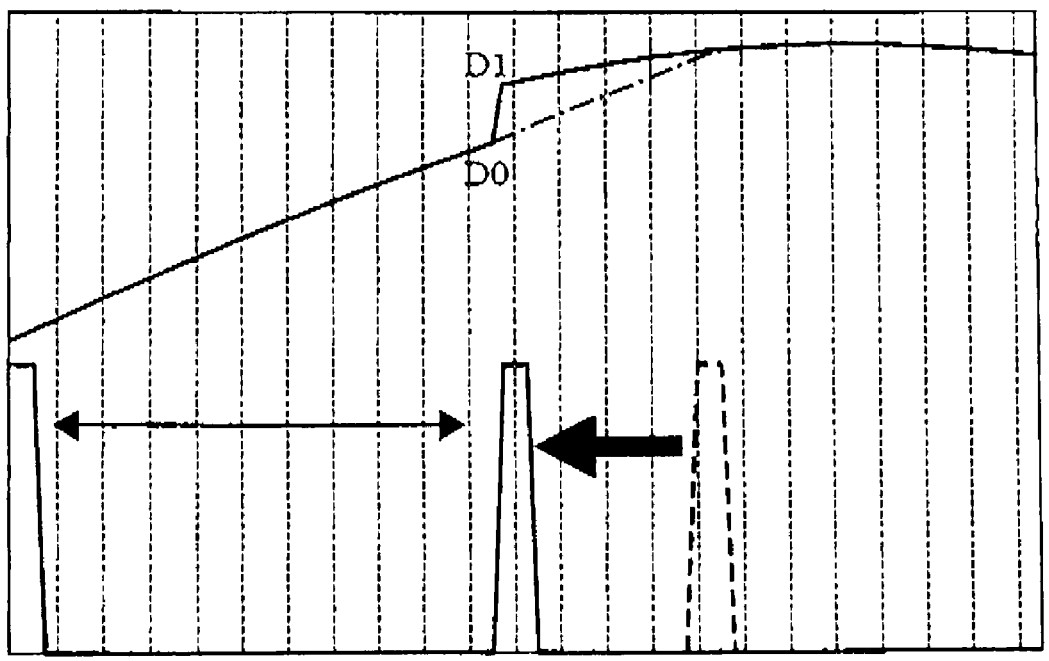
FIGS. 4A and 4B are charts showing distortions in a voltage waveform caused by shift in output timing of rotational position signals.

If D0<D1 at step S22, on the other hand which corresponds to the case shown in FIG. 4A, data D0' is obtained by adding predetermined value A to data D0 (step S23) and size of data D0' is compared with maximum value C of the sinusoidal data (step S24). If D0'≧C, maximum value C is represented as data D1, and if D0'<C, data D0' is represented as D1 (step S25).

Data D1 modified in the above described manner is outputted through selector 32 (step S26). By repeating the above described process, output data can be gradually modified in small amounts to eventually match the sinusoidal wave even if variation timing of position signals s0 to s2 is shifted.

According to the above described exemplary embodiment, motor control circuit 8 of the microcomputer 2 detects the rotor position of motor 6 by Hall elements 6Ha, 6Hb, and 6Hc of the position sensor. Then, based on the timing determined by the rotational position signal, sinusoidal waveform is read from waveform memory 12M and the voltage signal representing the waveform is outputted to windings 6u, 6v, and 6w of motor 6 through inverter circuit 5. Waveform calculating section 12, when outputting PWM signal in the current control period, compares the corresponding waveform data with the previous data and if the difference between the two are equal to or greater than predetermined value A, the current output is modified by a value that amounts to a portion of the difference. Thus, even if the timing in output of the position signal is shifted due to reasons such as mislocated Hall element 6H (a, b, and c) to possibly cause the value of waveform data read from waveform memory 12M to be significantly deviated from the amplitude ratio of a sinusoidal wave, the affect of such deviation on the drive of motor 6 can be relaxed through modification of the output data, thereby smoothening the drive of motor 6. Because predetermined value A is used for such data modification, the modification process can be simplified. By specifying predetermined value A at a value that would allow the output data to eventually conform with the waveform data of sinusoidal wave, vibration and noise can be substantially suppressed.

Further, since motor drive system 100 is configured by motor 6, control IC1, and inverter circuit 5, motor 6 can be driven by the sinusoidal PWM signal outputted from motor control circuit 8 through inverter circuit 5.

FIGS. 6 to 11 depict a second exemplary embodiment of the present invention. Elements that are identical to the first exemplary embodiment are represented by identical reference symbols and description will only be given for the elements that differ. FIGS. 6A and 6B depict control IC51 constituting the motor controller and corresponds to FIGS. 1A and 1B but differs from the configuration of the first exemplary embodiment in that the group of Hall elements 6H is replaced by position detection circuit 3 provided outside microcomputer 2 for generating and outputting position signals s0 to s2. Inverter circuit 5, motor 6, and control IC51 constitute motor drive system 101.

Between the output terminal of each phase of inverter circuit 5 and windings 6u, 6v, and 6w of the corresponding phase, shunt resistors 14u, 14v, and 14w serving as current detectors are connected phase by phase. Output voltages Vu, Vv, and Vw of inverter circuit 5, voltages applied to Vuo, Vvo, and Vwo, in other words, voltages at both ends of shunt resistors 14u, 14v, and 14w are inputted to current detection circuit 15 inside position detection circuit 3. The current detection circuit 15 outputs current signals iu, iv, and iw corresponding to currents Iu, Iv, and Iw of inverter circuit 5 based on the terminal-to-terminal voltage of shunt resistors 14u, 14v, and 14w. The circuit configuration of current detection circuit 15 is as shown in FIG. 7.

Figure 7:
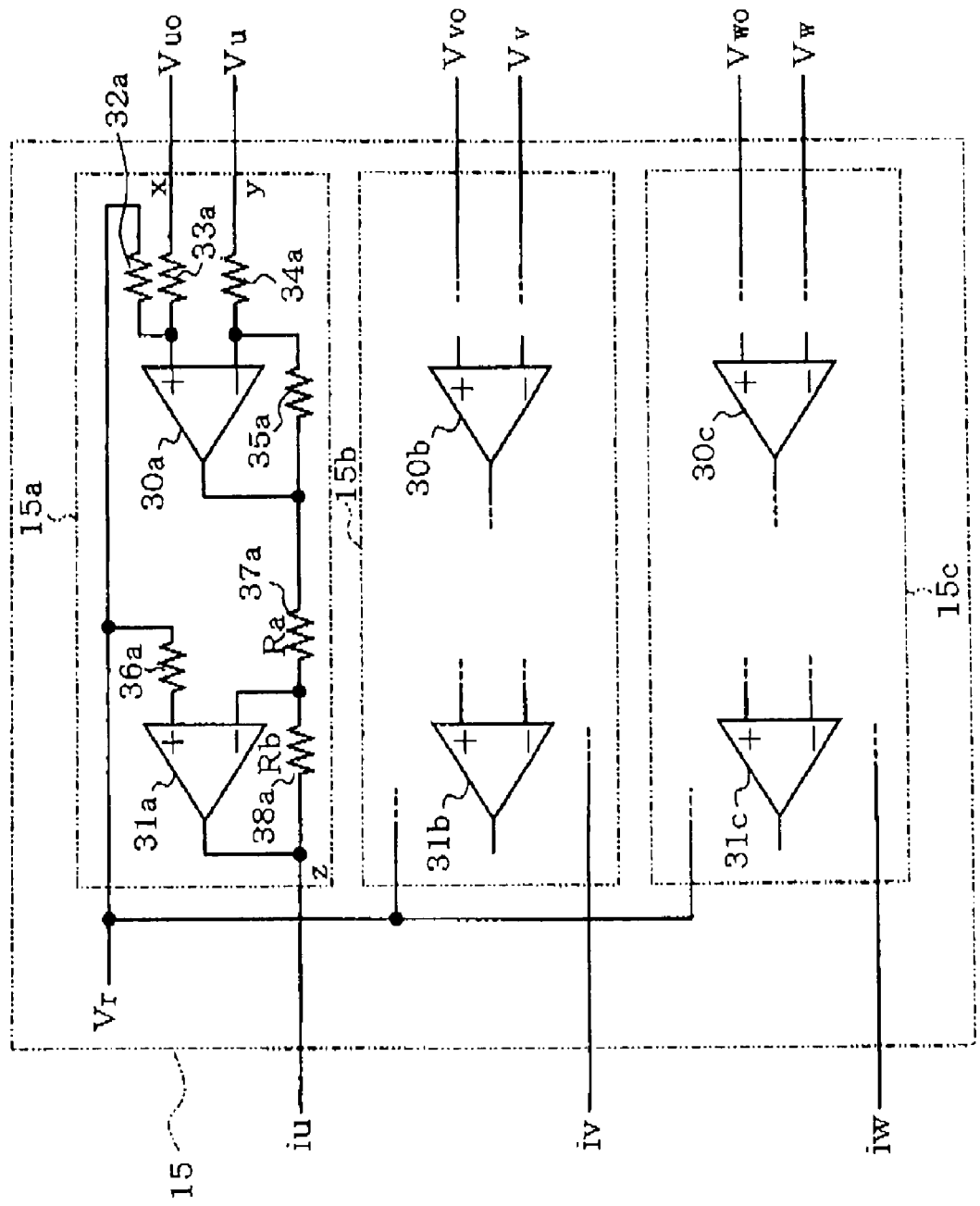
FIG. 7 shows the configuration of a current detection circuit.

Referring to FIG. 7, the U-phase, V-phase, and W-phase of current detection circuits 15a, 15b, and 15c are all identical in configuration. For instance, current detection circuit 15a comprises a differential amplifier circuit comprising operational amplifier 30a and resistors 32a to 35a and an inverting amplifier circuit comprising operator amplifier 31a and resistors 36a to 38a. Reference voltage Vr, given by a reference voltage generator circuit not shown, is generated to amount to a half (½) of power supply voltage Vcc, for example, and is given to non-inverting input terminals of operation amps 30a, and 31a through resistors 32a and 36a. Output signals iu, iv, and iw of current detection circuit 15 is given to induced voltage calculation circuit 19 through circuitry configured by resistors 16 and 17 and condenser 18.

The output terminals of inverter circuit 5 are connected to filter circuit 20 within position detection circuit 3 and the output signals from filter circuit 20 are inputted to induced voltage calculator circuit 19. Filter circuit 20 is configured by resistors 20a, 20b, and 20c connected between the output terminals of each phase of inverter circuit 5 and ground, and condensers 20x, 20y, and 20z.

Between the output terminals of current detection circuit 15 and input terminals of induced voltage calculation circuit 19, serial circuits configured by resistors 16a, 16b, and 16c and condensers 18a, 18b, and 18c are connected. Resistors 17a, 17b, and 17c are connected parallel to each of the serial circuits. Resistors 16a, 16b, and 16c are provided to prevent oscillation.

Induced voltage calculation circuit 19 (induced voltage calculating section) receives input of current signal iu, iv, and iw that are inputted from current detection circuit 15 through the above described circuitry and voltages vu, vv, and vw passed through filter circuit 20 to produce an output of induced voltage signals eu, ev, and ew corresponding to induced voltages Eu, Ev, and Eu.

Figure 8:
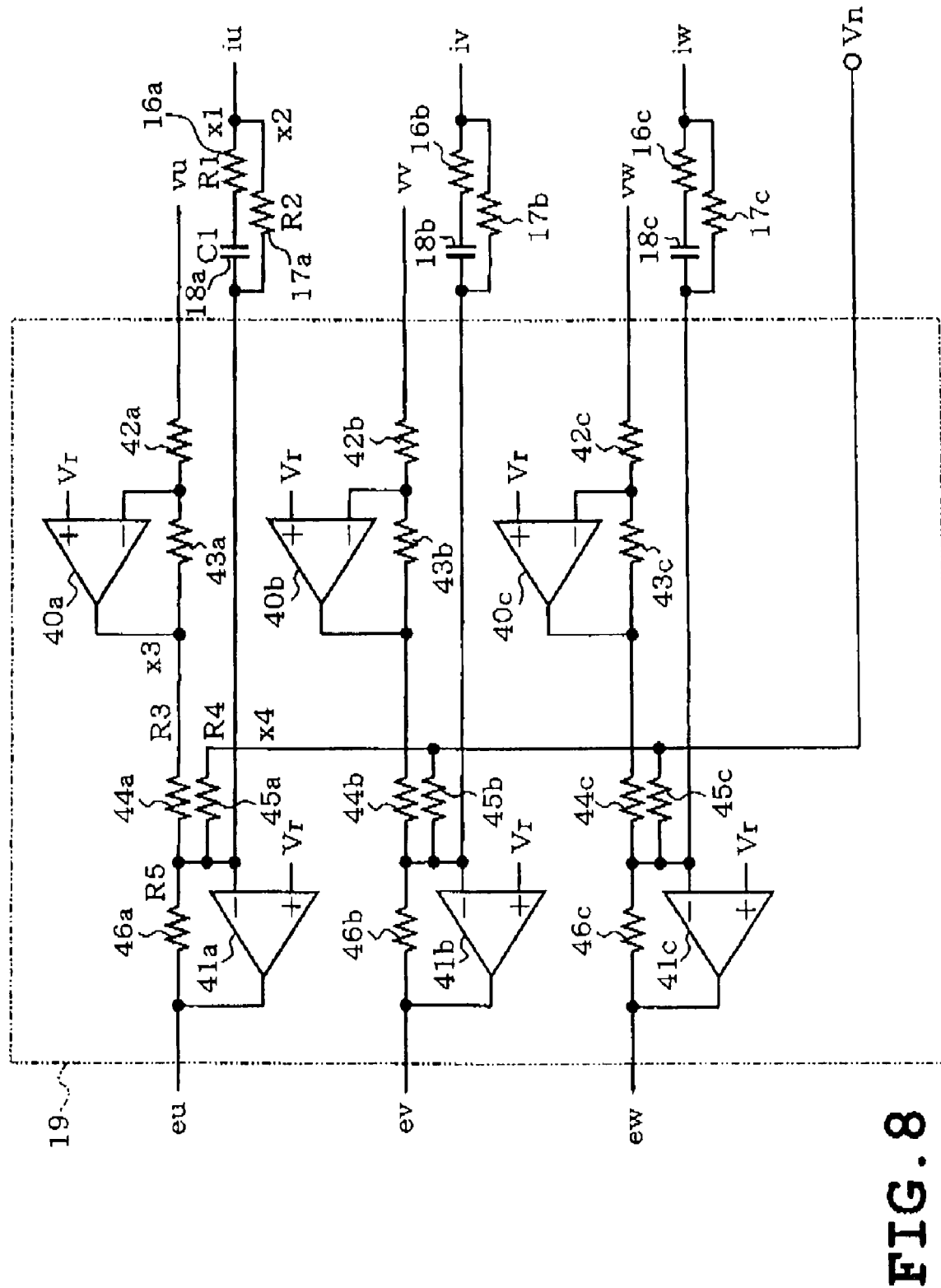
FIG. 8 shows the configuration of an induced voltage calculation circuit.

FIG. 8 shows the circuit configuration of induced voltage calculation circuit 19. The three phases are identical in configuration. For instance, the U-phase is configured by an inverse amplifier circuit comprising an operational amplifier 40a, and resistors 42a and 43a and an accumulator circuit comprising an operational amplifier 41a and resistors 44a, 45a, and 46a. The accumulator circuit is provided with neutral point voltage signal Vn through external multiplexer (MPX) 21 constituting a voltage selector.

Figure 6A:
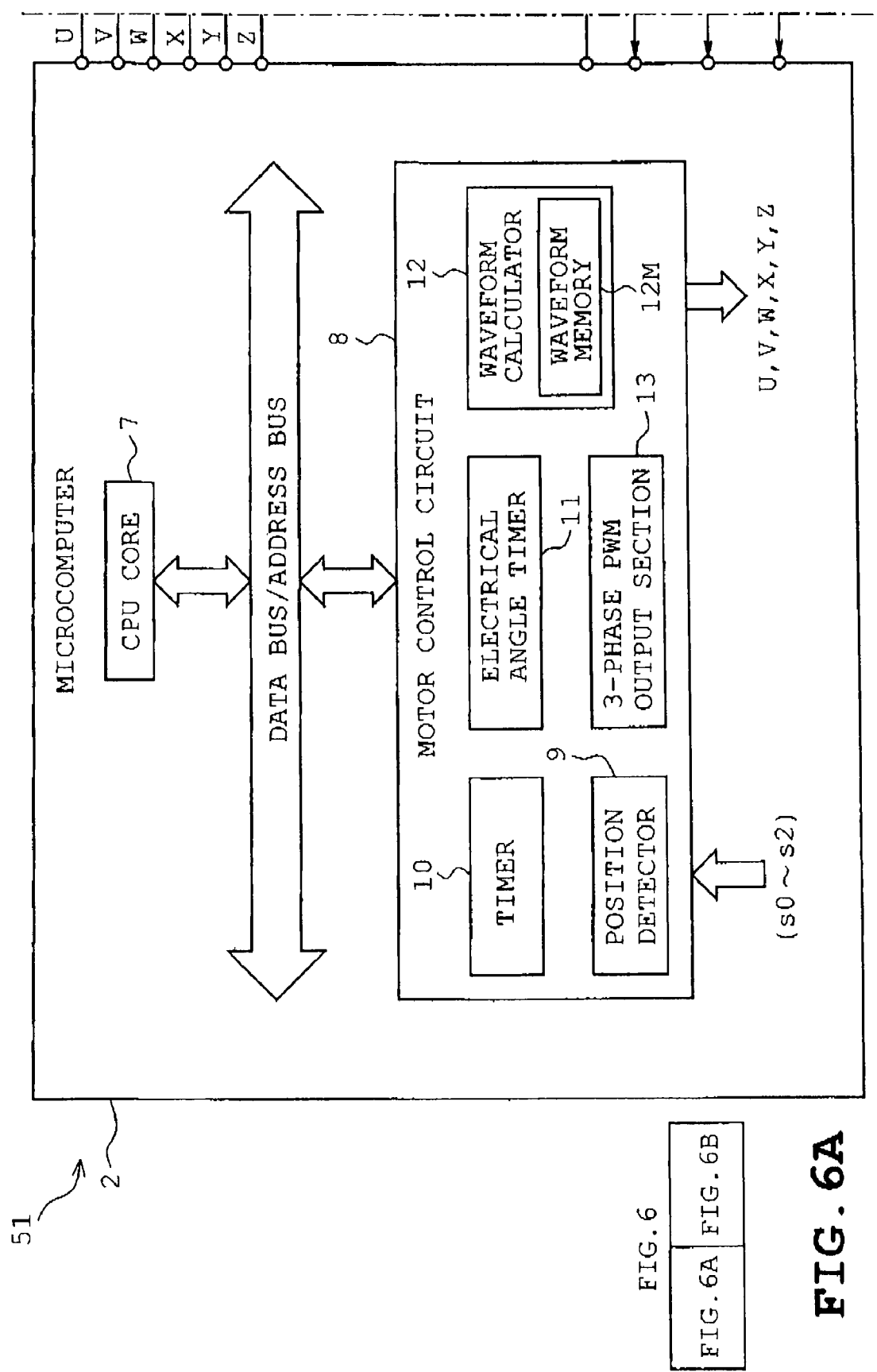

Referring to FIGS. 6A and 6B, multiplexer 21 receives input of virtual neutral point voltage Vn' occurring at the common connection point of resistors 22u, 22v, and 22w connected to the output terminals of each phase of inverter circuit 5 and neutral point voltage Vn given by directly connecting the neutral point of motor 6 to the input terminal of position detection circuit 3. Multiplexer 21 selects either of the voltages according to the selection signal inputted from microcomputer 2 and outputs the selected signal to induced voltage calculator circuit 19. The above described resistors 22u, 22v, and 22w constitute resistor circuit 22.

Figure 9:
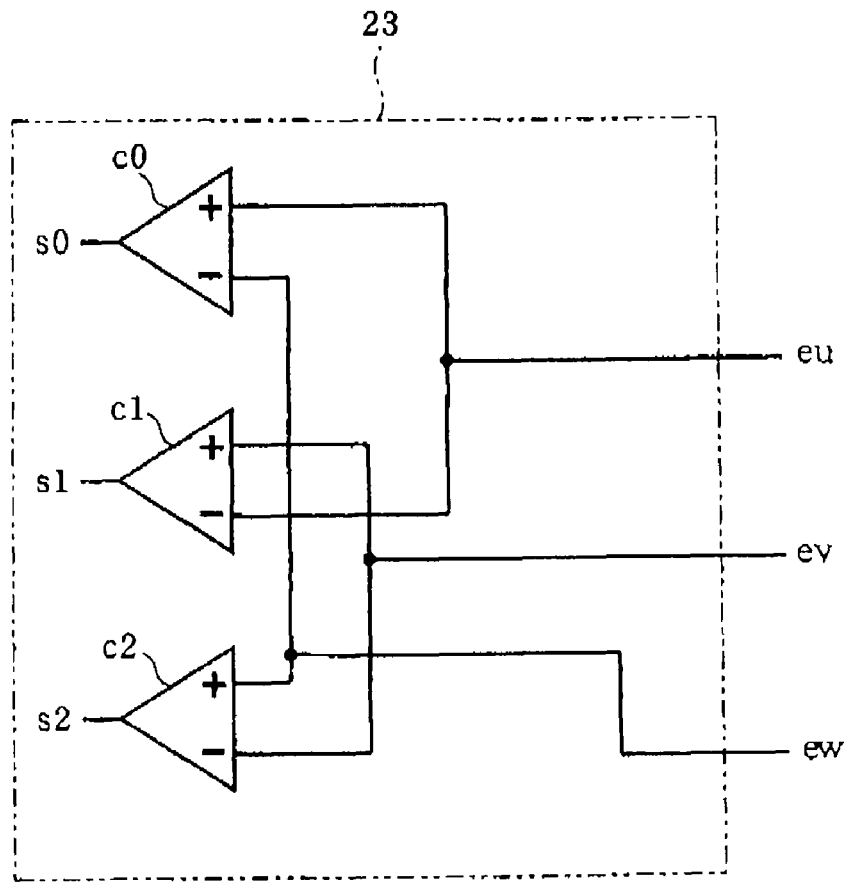
FIG. 9 shows the configuration of an induced voltage comparator circuit.

As shown in FIGS. 6A and 6B, induced voltage signals eu, ev, and ew outputted from induced voltage calculator circuit 19 are inputted into induced voltage comparator circuit 23. Induced voltage comparator circuit 23 has a circuit configuration shown in FIG. 9 and is configured to compare the induced voltages eu, ev, and ew, Referring to FIG. 9, comparators c0, c1, and c2 compare induced voltages eu with ew, ev with eu, and ew with ev, respectively and produce outputs of position signals s0, s1, and s2. Position detector circuit 3 utilizes a part of the configuration disclosed in JP 2006-254626 A.

Position signals s0, s1, and s2 outputted from induced voltage comparator circuit 23 are given to the input port of microcomputer 2. Position detector 9 of microcomputer 2 issues position detection interruption INTPDC based on position signals s0 to s2.

Next, the operation of the second exemplary embodiment will be described with further reference to FIGS. 10 and 11. First, a description will be given on the operation of current detection circuit 15 with reference to FIG. 7. Taking the example of U-phase current detection circuit 15a, resistors 32a to 35a have the same resistance. The initial stage differential amplifier circuit using operational amplifier 30a, as viewed in FIG. 7, outputs the difference in input voltage represented by x and y based on reference voltage Vr. The inverse amplifier circuit of the intermediary stage, using the operational amplifier 31a provides amplification at the rate of −Rb/Ra, where Ra and Rb represents the resistance at resistors 37a and 38a, respectively. Thus, voltage z outputted from current detection circuit 151s given by the following equation (1).

$$z = (Rb/Ra)(y-x) + Vr \tag{1}$$

Voltage (y−x) represents the voltage drop at shunt resistor 14 caused by current Iu flowing in winding current 6u of motor 6, thus, output voltage z can be described as current signal iu proportional to winding current Iu. Though not described in detail, V-phase and W-phase also operate in a similar fashion and produce current signals iu, iv, and iw proportional to currents Iu, Iv, and Iw flowing in windings 6u, 6v, and 6w.

Next a description will be given on the operation of induced voltage calculation circuit 19 with reference to FIG. 8. Output voltages Vu, Vv, and Vw of inverter circuit 5 exhibit waveforms switched by PWM signals, and are thus, given to induced voltage calculation circuit 19 through filter circuit 20. The filtered voltages vu, vv, and vw are inverse amplified based on reference voltage Vr and inputted to accumulator circuit.

Taking the example of the U-phase of induced voltage calculator circuit 19, output voltage z can be given by the following equation (2), where x1 to x4 represent the voltages at each element as shown in FIG. 8; R1, R2, R3, R4, and R5 the resistances at resistors 16a, 17a, 44a, 45a, and 46a; and C1 the capacitance at condenser 18a.

$$z=-R5 \cdot C1 \cdot dx1/dt-(R5/R2)x2-(R5/R3)x3-(R5/R4)x4 \quad (2)$$

Voltages x1 and x2 correspond to current signal iu; voltage x3 to voltage signal −vu; and voltage x4 to neutral point voltage signal Vn. When R5·C1 is considered as a product of inductance L of a single phase of motor 6 and inverse of resistance of shunt resistor 14u; (R5/R2) as a product of winding current R of a single phase of motor 6 and inverse of resistance of shunt resistor 14u; and (R5/R3) and (R5/R4) as 1, output voltage z can be given by the following equation (3).

$$z=-L \cdot dIu/dt-R \cdot Iu+vu-Vn \quad (3)$$

Figure 10:
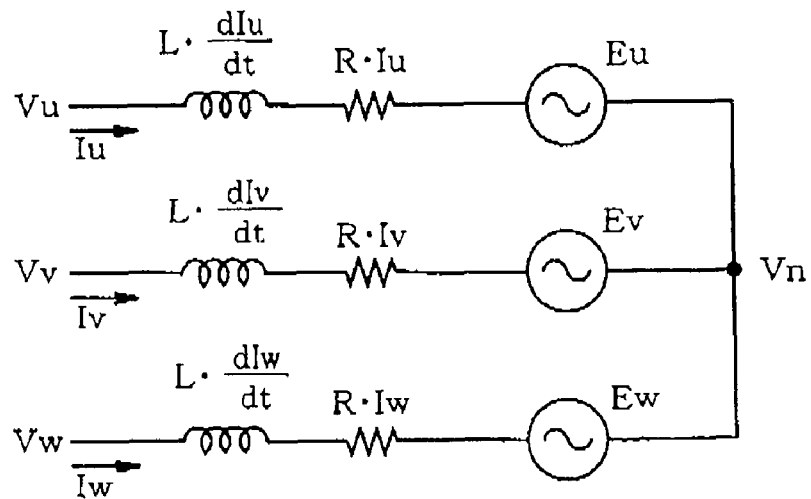
FIG. 10 is an equivalent circuit of a motor.
Figure 11:
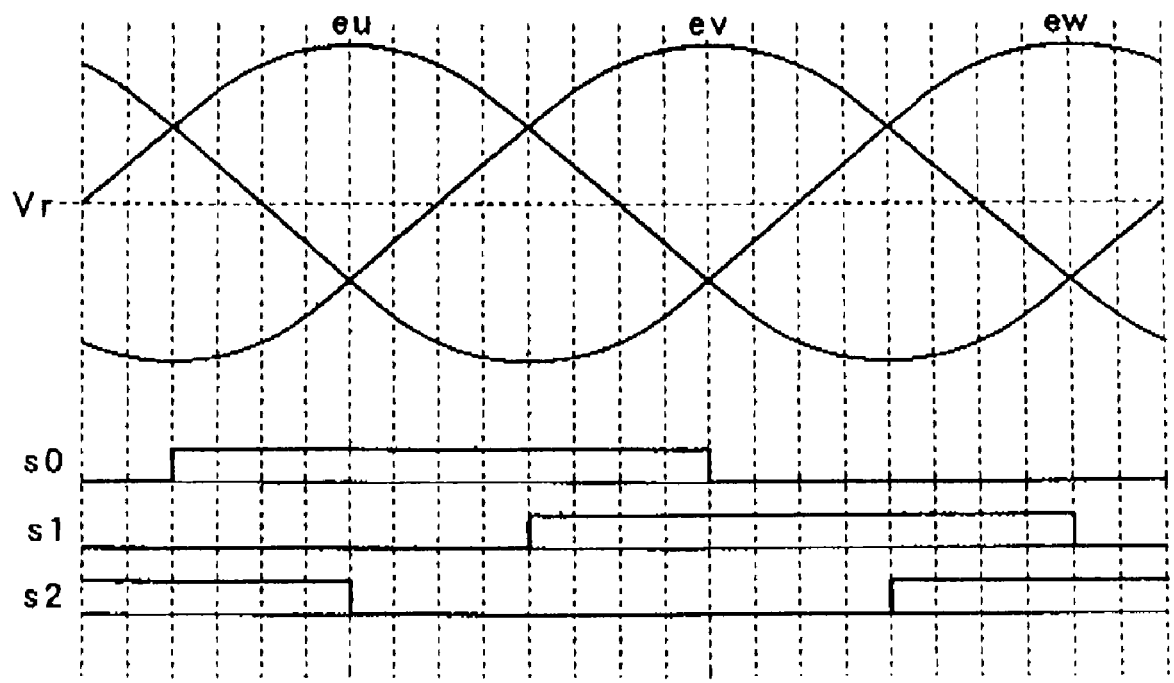
FIG. 11 is a chart describing the waveforms of an induced voltage signal and position signals s0 to s2.

When the above equation is compared with the equivalent circuit of motor 6 shown in FIG. 10, output voltage z amounts to induced voltage Eu. The same is true for other phases and induced voltage calculation circuit 19 outputs induced voltage signals eu, ev, and ew corresponding to induced voltages Eu, Ev, and Ew.

Next, a description will be given on the operation of induced voltage comparator circuit 23. FIG. 11 shows the waveforms of induced voltage signals eu, ev, and ew and output signals s0 to S2 of comparators c0 to c2. When induced voltage signals eu, ev, and ew are given as sinusoidal voltages, a single period is divided into six sections. To elaborate, the electric period is divided into two so as to correspond to "0" and "1" of signals s0 to s2 of comparators c0 to c2. Since output signals s0 to s2 of the three comparators c0 to c2 are timed differently, a single electrical period is divided into six 60 degrees sections corresponding to position detection modes 0 to 5 of microcomputer 2.

According to the second exemplary embodiment described above, control IC51 is configured by position detection circuit 3 and microcomputer 2. Position detection circuit 3 performs analog calculation process of induced voltages eu, ev, and ew of each phase of motor 6 based on the phase voltage equation given by voltage and current of motor 6 and motor constant of motor 6, and generates and outputs rotational position signals s0 to s2 of the rotor based on the phase relation of the induced voltages. Microcomputer 2 generates and outputs PWM signal based on rotational position signals s0 to s2. The three-phase PWM signal outputted by microcomputer 2 is driven by motor 6 through inverter circuit 5.

According to the above described configuration, the calculation of rotational position signalsx s0 to s2 is executed at high speed by the hardware process of position detection circuit 3 and microcomputer 2 generates and outputs PWM signal based on rotational position signals s0 to s2. Thus, position sensorless control can be executed at low cost with relaxed PWM control period limitation even when an 8 bit microcomputer with relatively low performance is used. Further, since microcomputer 2 is configured to allow output of sinusoidal PWM signal to motor 6, it can be effectively applied in usages that require acquisition of precise rotational position of the rotor.

Yet, further, since position detection circuit 3 has been provided with a resistor circuit 22 configured by resistors 22u, 22v, and 22w for generating and providing virtual neutral point voltage Vn' required for calculating induced voltages, eu, ev, and ew, position detection can be executed even when it is difficult to connect to the neutral point of motor 6. Further, since multiplexer 21 is provided at position detection circuit 3 for selecting and inputting virtual neutral point voltage Vn' and neutral point voltage Vn of motor 6 given by external elements, neutral point voltage used for position detection can be selected on a case by case basis.

Since control IC51 according to the second exemplary embodiment also executes output data modification at motor control circuit 8 of microcomputer 2 as was the case in the first exemplary embodiment, the output data can be similarly smoothened even when output timings of position signals s0 to s2 are varied due to variation in circuit constant, etc., in case where position detection circuit 3 is used instead of group of Hall elements 6H.

Figure 12:
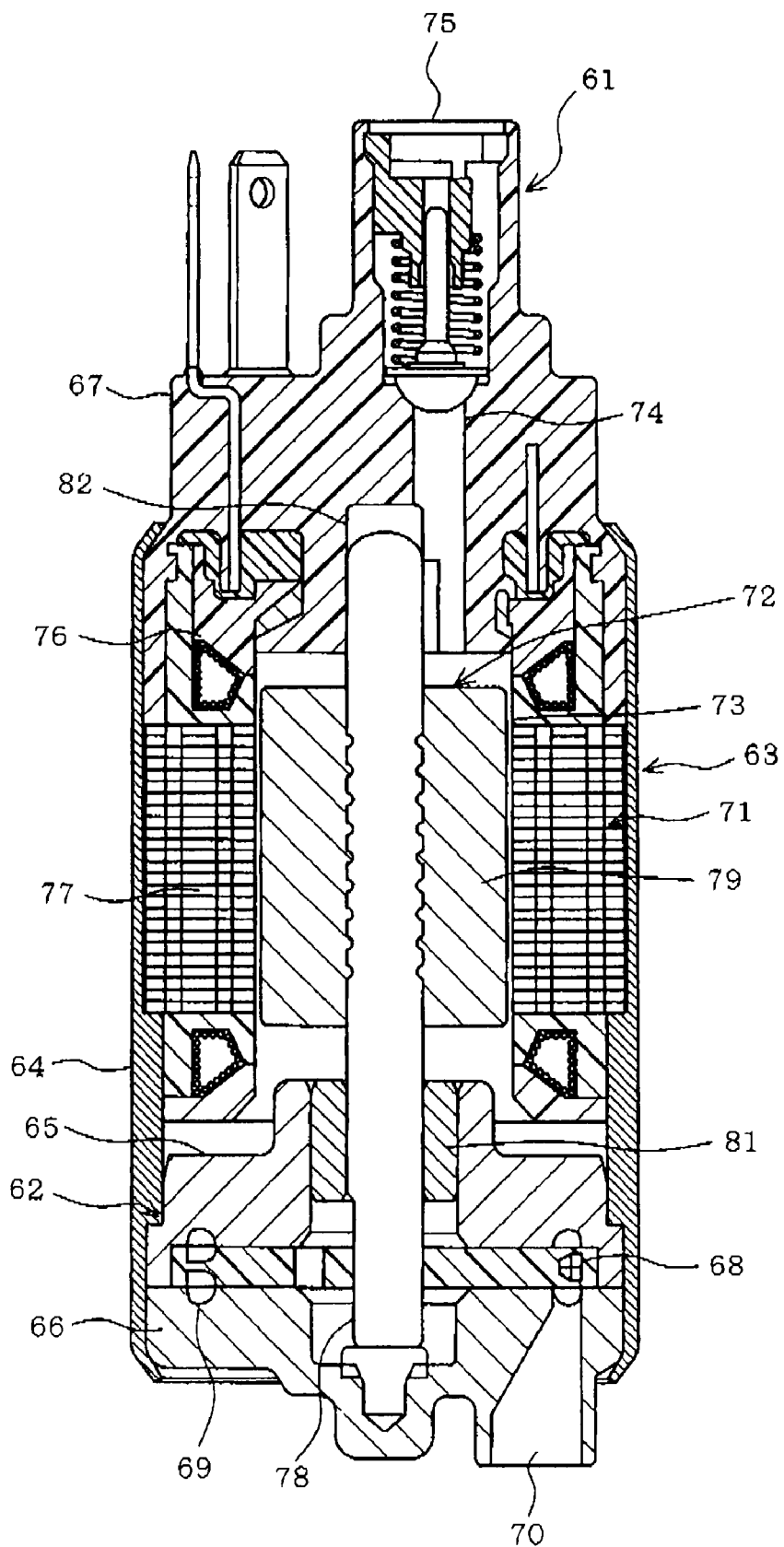
FIG. 12 is a vertical cross sectional side view of a fuel pump unit according to a third exemplary embodiment.

FIG. 12 depicts a third exemplary embodiment of the present invention. The third exemplary embodiment applies the motor drive system described in the first or the second exemplary embodiments to an energy pump used in an internal combustion engine of vehicles, for example. Energy pump 61 includes pump mechanism 62 and brushless DC motor 63, also referred to hereinafter as a permanent magnet motor or pump motor, that drives pump mechanism 62. Pump mechanism 62 and motor 63 are both enclosed by housing 64, and housing 64 has pump case 65, pump cover 66, and end cover 67 secured to it.

Pump case 65 and pump cover 66 rotatably contain impeller 68, and pump path 69 running along the circumference of energy pump 61 in a C-shape is provided between the pump case 65, pump cover 66, and impeller 68. Fluid fuel introduced from the inlet 70 provided at pump cover 66 is increased in pressure within pump path 69 by the rotation of impeller 6B and transferred by pressure toward motor 63 to be discharged from outlet 75 through energy path 73 and discharge path 74 situated between stator core 71 and rotor 72.

Motor 63 has a circumferentially disposed stator core 71 having a plurality of cores having coil 76 wound on them and rotor 72 having shaft 78 and permanent magnet 79. Rotor is provided rotatably at the inner periphery of stator core 71 and the axial ends of shaft 78 are supported by bearings 81 and 82 respectively. Motor 63 is driven by controlled energization to coil 76 by control IC1 through inverter circuit 5 as described in the first exemplary embodiment. The rotation of rotor 72 causes rotation of shaft 78 and impeller 68 to pressurize the fuel within pump path 69.

According to the third exemplary embodiment described above, fuel pump 61 comprises a pump mechanism 62, motor 63 that drives pump mechanism 62, and a motor drive system 100. Thus, fuel can be transferred by motor drive system 100 of the present invention.

The present invention is not limited to the above described and shown exemplary embodiments but may be modified or expanded as follows.

Waveforms can be read in any given electrical angle intervals and may be read at intervals shorter than the electrical angle of 15 degrees.

The value used in modifying the output data is not limited to the predetermined value but may be replaced by other values that constitute a portion of the difference of data D0 and data D1.

In the second exemplary embodiment, motor constant can be adjusted depending on the brushless DC motor used by connecting condensers 18a, 18b, and 18c and resistors 17a, 17b, and 17c concerning motor constants L and R to external elements of the drive control IC.

Further, in the second exemplary embodiment, induced voltage comparator circuit 23 may compare induced voltages eu, ev, and ew with reference voltage Vr and set the zero-cross point of induced voltages eu, ev, and ew as the reference point of the electrical angle of 60 degrees.

Yet, further in the second exemplary embodiment, shunt resistors 14u, 14v, and 14w provided at the current detector may be replaced by shunt resistors inserted between the source and the ground of FET 5n provided at the lower arm of inverter circuit 5.

In the third exemplary embodiment, the pump unit is not limited to an energy pump for vehicle applications. It is further not limited to fluid (such as fuel) transferring purposes but may be used for transferring gas such as oxygen and air.

The switching elements configuring the inverter circuit is not limited to ET but may employ IGBT or power transistors.

Microcomputer 2 is not limited to a Toshiba Corporation product. Any microcomputer having a similar architecture and provided with similar motor control capabilities may be partially modified to be incorporated into the configuration of the present invention.

The foregoing description and drawings are merely illustrative of the principles of the present disclosure and are not to be construed in a limited sense. Various changes and modifications will become apparent to those of ordinary skill in the art. All such changes and modifications are seen to fall within the scope of the disclosure as defined by the appended claims.

What is claimed is:

1. A motor controller for controlling a permanent magnet motor including a rotor provided with a permanent magnet and a stator provided with multiphase windings, comprising:
    a position detector that generates and outputs a rotational position signal of the rotor;
    a waveform data storage that stores sinusoidal waveform data;
    a drive signal output section that reads the waveform data from the waveform data storage at timings determined based on the rotational position signal and that outputs a voltage signal corresponding to the waveform data to the windings through a drive section;
    a data history storage that stores data corresponding to the voltage signal outputted in a previous control period; and
    an output data modifier that, when outputting the voltage signal in a current control period, compares corresponding waveform data with a previous data stored in the data history storage, and if difference between the current waveform data and the previous data is equal to or greater than a predetermined value, data to be currently outputted is modified by an amount corresponding to a portion of the difference.

2. The motor controller of claim 1, wherein the position detector comprises a position sensor.

3. The motor controller of claim 1, wherein the position detector performs analog calculation of an induced voltage occurring at each phase of the motor based on a phase voltage equation including a motor voltage, a motor current, and a motor constant and generates the rotational position signal of the rotor based on a phase relation of the induced voltage.

4. The motor controller of claim 1, wherein data used in the modification by the output data modifier is set at the predetermined value.

5. The motor controller of claim 1, wherein data used in the modification by the output data modifier is set at a value such that output data corresponds to the sinusoidal waveform data through repeating the modification for predetermined times.

6. A motor drive system, comprising:
    a permanent magnet motor that includes a rotor provided with a permanent magnet and a stator provided with multiphase windings;
    a position detector that generates and outputs a rotational position signal of the rotor;
    a waveform data storage that stores sinusoidal waveform data;
    a drive signal output section that reads the waveform data from the waveform data storage at timings determined based on the rotational position signal and that outputs a voltage signal corresponding to the waveform data to the windings through an inverter circuit;
    a data history storage that stores data corresponding to the voltage signal outputted in a previous control period; and
    an output data modifier that, when outputting the voltage signal in a current control period, compares corresponding waveform data with a previous data stored in the data history storage, and if difference between the current waveform data and the previous data is equal to or greater than a predetermined value, data to be currently outputted is modified by an amount corresponding to a portion of the difference.

7. A pump unit, comprising:
    a pump mechanism that transfers fluid;
    a pump motor that includes a rotor provided with a permanent magnet and a stator provided with multiphase windings and that drives the pump mechanism;
    a position detector that generates and outputs a rotational position signal of the rotor;
    a waveform data storage that stores sinusoidal waveform data;
    a drive signal output section that reads the waveform data from the waveform data storage at timings determined based on the rotational position signal and that outputs a voltage signal corresponding to the waveform data to the windings through an inverter circuit;
    a data history storage that stores data corresponding to the voltage signal outputted in a previous control period; and
    an output data modifier that, when outputting the voltage signal in a current control period, compares corresponding waveform data with a previous data stored in the data history storage, and if difference between the current waveform data and the previous data is equal to or greater than a predetermined value, data to be currently outputted is modified by an amount corresponding to a portion of the difference.

* * * * *